United States Patent
Walker et al.

(10) Patent No.: US 6,325,284 B1
(45) Date of Patent: Dec. 4, 2001

(54) DEVICE AND METHOD FOR PROMOTING THE SELECTION AND USE OF A CREDIT CARD

(75) Inventors: Jay S. Walker, Ridgefield, CT (US); Bruce Schneier, Minneapolis, MN (US); Magdalena Mik, Greenwich, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/223,164

(22) Filed: Dec. 30, 1998

(51) Int. Cl.[7] .................................. G06K 5/00
(52) U.S. Cl. .......................... 235/380; 235/487
(58) Field of Search ..................... 235/380, 379, 235/487

(56) References Cited

U.S. PATENT DOCUMENTS

| | | |
|---|---|---|
| 4,443,027 | 4/1984 | McNeely et al. . |
| 4,614,144 | 9/1986 | Sagara et al. . |
| 4,648,189 | 3/1987 | Michel . |
| 4,667,088 | 5/1987 | Kramer et al. . |
| 4,677,657 * | 6/1987 | Nagata et al. ............... 235/380 X |
| 4,692,745 | 9/1987 | Simanowitz . |
| 4,851,654 * | 7/1989 | Nitta ............................. 235/379 X |
| 4,916,296 | 4/1990 | Streek . |
| 5,056,145 | 10/1991 | Yamamoto et al. . |
| 5,140,517 * | 8/1992 | Nagata et al. ............... 235/379 X |
| 5,192,947 | 3/1993 | Neustein . |
| 5,204,657 | 4/1993 | Prosser et al. . |
| 5,234,729 | 8/1993 | Wheatley . |
| 5,359,183 | 10/1994 | Skodlar . |
| 5,412,192 | 5/1995 | Hoss . |
| 5,418,520 | 5/1995 | Hirshberg . |
| 5,515,031 | 5/1996 | Pereira et al. . |
| 5,548,271 | 8/1996 | Tsuchiyama et al. . |
| 5,585,787 | 12/1996 | Wallerstein . |
| 5,642,095 | 6/1997 | Cook . |
| 5,675,627 | 10/1997 | Yaker . |
| 5,679,939 | 10/1997 | Watanabe . |
| 5,746,451 | 5/1998 | Weyer . |

FOREIGN PATENT DOCUMENTS

| | | |
|---|---|---|
| 0 785 527 A2 | 7/1997 | (EP) . |
| 0 785 527 A3 | 11/1998 | (EP) . |
| 2 629 613 A1 | 3/1988 | (FR) . |
| WO 98/24071 | 6/1998 | (WO) . |

OTHER PUBLICATIONS

Satoshi Ohta et al., "Packaging Technology for Smart IC Cards with a Display Element", OKI Technical Review, Jun. 1991 at p. 49.

Abstract: "These Batteries are Ultra–Thin", Oak Ridge National Laboratory R&D Journal, Sep. 1996 at p. 66.

Lisa Fickenscher, "Chase Lens Card Magnifies Its Bid to be Picked For Use", American Banker, Aug. 13, 1998 at p. 20.

* cited by examiner

*Primary Examiner*—Karl D. Frech
(74) *Attorney, Agent, or Firm*—Dean P. Alderucci (57) ABSTRACT

A device and method is disclosed for promoting the selection and use of a credit card. Add a feature to a credit card which is intended to attract a consumer's attention and motivate him to consider selecting the credit card. The device includes a sensor which is adapted and configured to sense a predefined physical change. The sensor is in communication with a driver circuit, which is in turn in communication with a transducer. When the sensor detects a predefined physical change, the driver circuit produces at least one driver signal for a predetermined amount of time. The transducer is adapted and configured to emit at least one perceptible output signal in response to receiving the at least one driver signal.

120 Claims, 10 Drawing Sheets

DEVICE AND METHOD FOR PROMOTING THE SELECTION AND USE OF A CREDIT CARD

BACKGROUND OF THE INVENTION

1. Field of Invention

The present invention relates generally to a device and method for promoting the selection and use of a credit card.

2. Background of the Related Art

Each year, more and more credit cards are offered by credit card issuers to consumers. These credit cards are commonly offered to consumers through the mail and at points of purchase. In both cases, credit card issuers include some type of enticement as part of their marketing effort to distinguish their credit card offer from their competitors' so as to attract the attention of consumers. An ideal method of enticement encourages consumers to open an account with the credit card issuer and, once an account has been opened, motivates the consumer to use the new credit card. In this way, continuous revenue for the credit card issuer may be generated.

One method that is used to encourage consumers to establish an account and to use a particular credit card is an incentive program that offers awards to consumers. For example, such well-known programs provide frequent-flyer mile earnings or cash-back bonuses based on the amount charged on a credit card. Another program provides discounts to consumers for purchasing products or services at participating merchants' businesses. Yet another program offers co-branded cards in which a credit card issuer affiliates itself with another company or organization in order to offer a consumer certain purchasing advantages. The purchasing advantages may include discounts on purchases of products and/or services from the co-branded company or financial support for a particular organization that the consumer chooses to be associated with, such as a college alumnus organization.

A particular example of a method intended to promote a consumer's selection and use a credit card is disclosed in U.S. Pat. No. 5,513,102 to Auriemma ("'102 patent"). This patent teaches a method wherein a user earns, for each predetermined transaction amount, a coupon that is redeemable by the user for a lottery ticket. In this way, the user has an opportunity to recover at least a portion of his transaction-based expenditures.

A disadvantage of program-based incentives such as those described above and, for example, that described in the '102 patent, is that a large number of consumers typically do not take the time to read the rules and options of the programs. Nor do they take the time to calculate the possible cost savings. To the contrary, these consumers tend to establish accounts with credit card issuers by impulse rather than based on a careful evaluation of merits of the offered programs. In particular, they are more likely to accept an offer to open an account with a credit card issuer at times that happen to be convenient for them and/or that in some way attract their attention over other similar products or services made available to them.

In an attempt to attract those consumers that are responsive to marketing methods that provide immediate convenience and/or that attract their attention over other similar products, credit card issuers have added unique physical features to their credit cards. For example, credit card issuers have offered credit cards to consumers which have their pictures imprinted on the face of the credit card. The pictures function as a form of identification for the consumer and are also used for security purposes.

In addition, credit card issuers have offered credit cards which include illustrations depicting various themes that appeal to consumers' interests. Credit cards that have illustrations depicting various themes are disclosed in U.S. Pat. No. 5,746,451 to Weyer. The Weyer patent includes an overlay that can be adhered to the face of a credit card. The overlay can include a variety of illustrations depicting political, religious, and humorous scenes. In addition, the overlay can include artistic designs such as a wildlife scene for ecology minded consumers.

Further, credit cards have been offered which incorporate a utilitarian feature, such as a magnifier, that can be used by a consumer. Such as a credit card is disclosed in U.S. Pat. No. D387,802 to Finkelstein et al. This design patent discloses a magnifying lens that is laminated into the face of a credit card. The credit card can then be used by a consumer to magnify finely printed material, such as the printed expenses found in restaurant checks and sales drafts.

A disadvantage of the above described attempts to attract consumers by offering them credit cards having unique physical features is that the features do not sufficiently differentiate the credit cards from other credit cards. More specifically, these previous attempts have primarily added only passive attributes to credit cards and, therefore, do not readily gain the attention of consumers.

In addition to the above disadvantages, credit card issuers are confronted with the problem that most consumers already have a number of credit cards to select from when they are deciding to make a purchase. As described above, consumers typically do not read the rules and options of a program, nor do they take the time to calculate the possible savings the various programs offer. Therefore, it is infrequent that a consumer will choose a credit card because of a particular incentive program. Indeed, it is more likely that a consumer will be attracted to a credit card because of its unique physical features, than because of an incentive program associated with it.

In view of the above described disadvantages, there is clearly a need in the art for a credit card that embodies characteristics that would distinguish it over a competitor's credit card and, further, that would induce a consumer to select and use the credit card at a point of purchase.

SUMMARY OF THE INVENTION

The present invention provides a novel and unique device and method for promoting the selection and use of a credit card. The device and method adds a feature to the credit card that is intended to attract the attention of consumers and motivate them to select and use the credit card. The feature is particularly useful in distinguishing the credit card from other credit cards in close proximity therewith such as when the credit card is in a wallet of a consumer.

The device for promoting the selection and use of a credit card includes a sensor which is adapted and configured to sense a predefined physical change. The sensor is in communication with a driver circuit. The driver circuit produces at least one driver signal for a predetermined amount of time when the sensor detects a predefined physical change. A transducer is in communication with the driver circuit and is adapted and configured to emit at least one perceptible output signal in response to receiving the at least one driver signal. A resetting circuit is adapted and configured to reset the driver circuit after the predefined physical change is removed.

The components and interconnections therefor are incorporated into a credit card. The sensor and transducer are, for example, located proximate the top edge of the credit card. This location permits the sensor to properly detect the predefined physical change and permits a consumer to readily observe the output signal produced by the transducer when the credit card is stored in a pocket of a wallet.

The predefined physical change may be, for example, a change in ambient light, pressure, or noise. Components for sensing these types of physical change can include a solar cell, pressure sensor, or a microphone, respectively. The driver circuit can be a processor or logic circuit. A processor can be used to generate a random number which is then used to randomly select the at least one driver signal from a plurality of driver signals stored in a memory.

The transducer can be a liquid-crystal display ("LCD") and the plurality of driver signals may represent, for example, messages or lottery numbers. The transducer can also be a speaker and the plurality of driver signals may represent, for example, different tones or phrases. In such case, the speaker may be a piezoelectric vibrator. Further, the transducer can be a light-emitting diode ("LED") and the plurality of driver signals may represent different signal patterns. For example, the driver circuit may transmit driver signals to the LED that produce intermittent pulses of light or light pulses produced according to a predetermined pattern. The light emitted from the LED can be transmitted through the body of the credit card by a fiber optic channel.

The device also includes a power source for energizing the device throughout the useful life of the credit card. The power source may be, for example, a solar cell, an inductive power system, a radioactive cell, or a thin film lithium battery. The solar cell can be used as both a sensor and a power source. Output of the power source can be controlled, for example, by (i) a controller, (ii) the driver circuit, (iii) a separate dedicated processor, or (iv) a separate dedicated logic circuit.

An embodiment of the present invention also includes a switch which is adapted and configured to change the output of the transducer from a first driver signal to a second driver signal. Another embodiment of the present invention includes two transducers in communication with the driver circuit and further includes a switch which is adapted and configured to redirect the at least one driver signal from one of the two transducers to the other.

The device can further include a clock that is adapted and configured to cooperate with the driver circuit to determine time. Different driver signals can then be sent to the transducer based on the time as calculated by the driver circuit.

These and other unique features of the device and method disclosed herein will become more readily apparent from the following description of the drawings.

BRIEF DESCRIPTION OF THE DRAWINGS

So that those of ordinary skill in the art to which the subject invention pertains will more readily understand how to make and use the device and method described herein, preferred embodiments of the invention will be described in detail with reference to the drawings, wherein.

These and other features of the device and method disclosed herein will become more readily apparent from the following detailed description of the embodiments taken in conjunction with the drawings.

DETAILED DESCRIPTION OF THE PREFERRED EMBODIMENTS

Reference is now made to the accompanying Figures for the purpose of describing, in detail, the preferred embodiments of the present invention. The Figures accompanying the detailed description are provided as examples of the invention and are not intended to limit the scope of the claims appended hereto.

Conventional credit cards are a well known form of identification used by individuals to have merchandise, services, etc., billed to a charge account. The term "credit card", however, is intended herein to include any type of card carried by a consumer which is physically similar to a conventional credit card. Examples of such cards include debit cards, smart cards, Internet access card, prepaid calling card, electronic cash card, health insurance, association membership, and airline mileage cards. Although the term is to be understood to include all such cards, the detailed described herein below relates to conventional credit cards so as to provide a more simplified explanation of the invention. Those skilled in the art will understand that a smart card may include components that may perform some or all of the functionality of the present invention.

Those skilled in the art will readily recognize that products exhibiting at least one of the following physical features often attract the attention of consumers: (i) a feature that moves or simulates movement; (ii) a feature that includes light elements, especially lights that periodically pulse; (iii) a feature incorporating bright colors; (iv) a feature that produces a sound; and (v) a feature that arouses the consumer's sense of curiosity or raises their anticipation.

The present invention provides a device and method for a credit card with a novel physical feature (such as those described above) to attract a consumer's attention and encourage him to open an account with a credit card issuer. In addition, the present invention entices a consumer to use the credit card preferentially over other credit cards available to him at a point of purchase.

Figure 1:
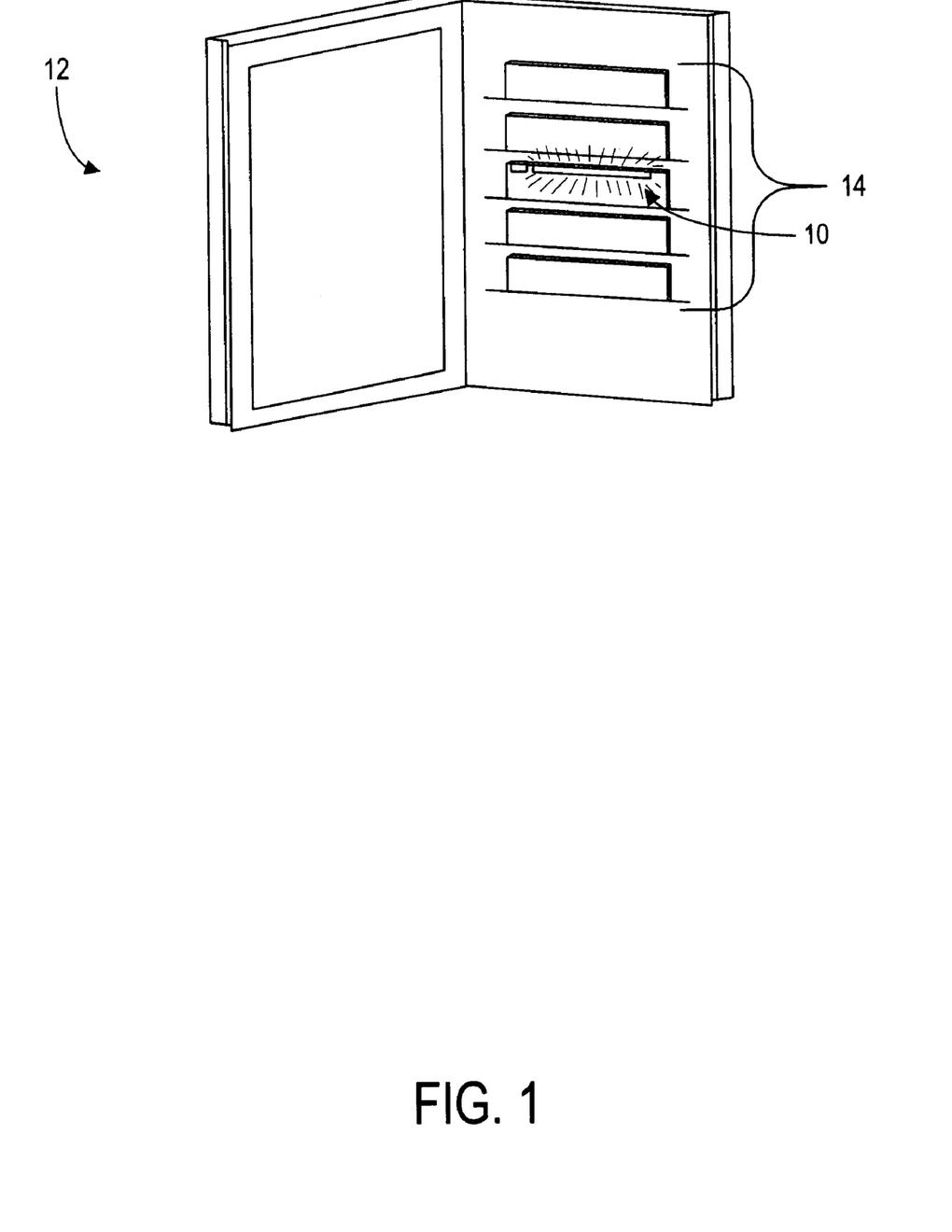
FIG. 1 is a perspective view of a wallet having a credit card therein which includes an embodiment of the present invention.

Referring now to FIG. 1, an open wallet 12 is shown to illustrate an embodiment of the disclosed invention. As is typical of many consumers' wallets, a number of credit cards 14 are positioned in close proximity to one another in pockets of wallet 12.

A moment of great interest to credit card issuers is when a consumer has his wallet open and is about to select a credit card to make a purchase. The present invention takes advantage of the situation by providing a device and method which distinguishes a credit card from other physically similar credit cards that are in close proximity thereto. In this way, upon opening wallet 12, a consumer's eye is immediately drawn toward a particular credit card 10, thereby encouraging its selection and use.

Figure 2:
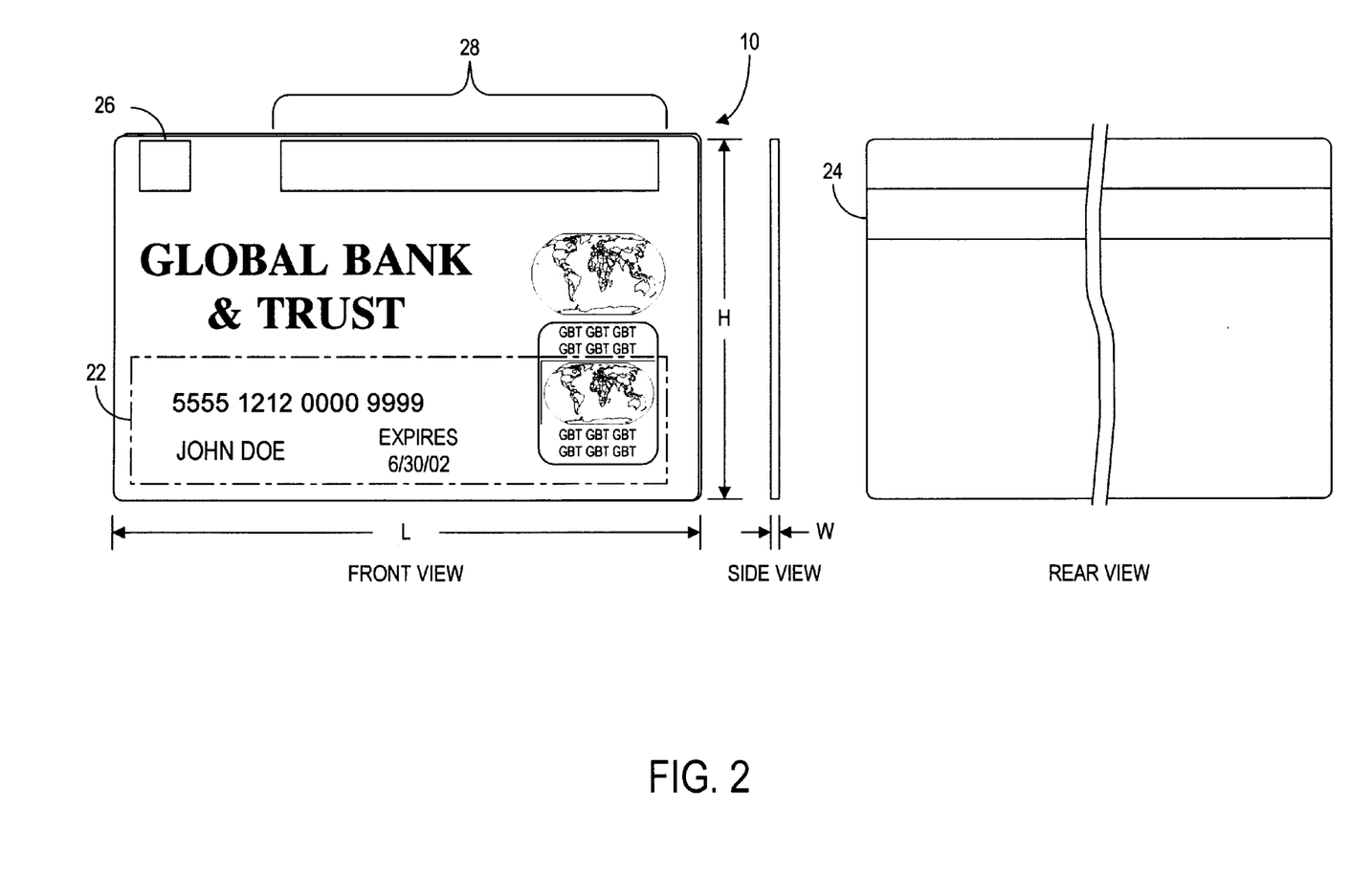
FIG. 2 is a front, side, and rear elevation view of the credit card shown in FIG. 1.

Referring now to FIG. 2, credit card 10 is shown, which conforms with the "Standards for Credit Card Specifications," ISO 7810, of the International Organization for Standardization. As is well known, credit card 10 has a length ("L"), height ("H"), and width ("W") of approximately 3.375, 2.127, and 0.030 inch, respectively.

Referring to the Front View of FIG. 2, an embossing area 22 is located on the lower portion of credit card 10 and has the approximate dimensions of one (1) inch by three (3) inches. The embossing area 22 is reserved for credit card issuers to emboss a consumer's name and credit card account information. The Rear View shows a magnetic strip 24 adhered to the upper portion of credit card 10 for encoding a consumer's account information in machine readable form.

Referring again to the Front View of FIG. 2, a sensor 26 is molded into the upper left-hand portion of credit card 10. A transducer 28 is molded into the upper portion of credit card 10. It is convenient to position sensor 26 and transducer 28 at or near the upper edge of credit card 10 so that they are not blocked by other credit cards when the credit card is stored in wallet 12 and not thwarted from functioning as intended. Of course, the location of sensor 26 and transducer 28 are not considered critical to the present invention so long as they are capable of performing their intended respective functions as described.

As will be more fully described below, sensor 26 is configured to cooperate with transducer 28 such that when sensor 26 detects a predefined physical change, it activates transducer 28 to emit a perceptible output signal. The physical change can be one of a number of physical changes known in nature including, for example, a change in light intensity, pressure, or sound. Sensor 26 can be any of a number of appropriate elements for sensing a physical change, for example, a solar cell, pressure sensor, or microphone. Transducer 28 can be any of a number of elements for emitting perceptible output signals, for example, a light emitting diode ("LED"), liquid crystal display ("LCD"), or a speaker.

As an example of the above described credit card in use, consider that a consumer opens wallet 12 (FIG. 1) to select a credit card from his collection of credit cards 14 stored therein. Further, assume that sensor 26 is a solar cell and transducer 28 is an LED. When wallet 12 is opened, the solar cell detects a physical change in ambient light and activates the LED to pulse in a predetermined pattern. Because of this distinguishing feature, the consumer immediately recognizes credit card 10 and is motivated to consider whether to use it for charging a purchase.

Figure 3:
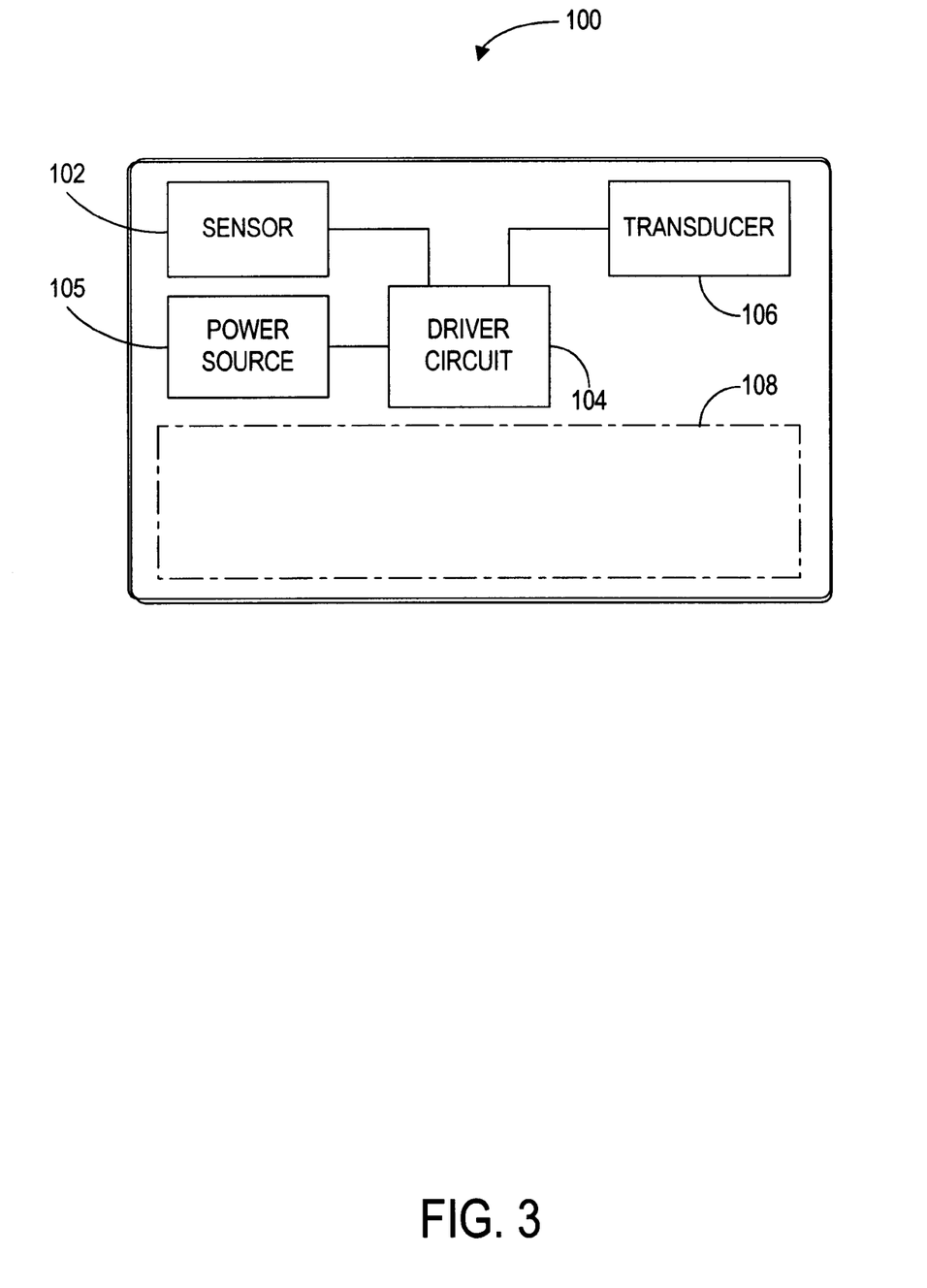
FIG. 3 is a front elevation view in schematic form of a credit card which includes an embodiment of the present invention, wherein basic components are shown.

Referring now to FIG. 3, there is illustrated in schematic form a credit card 100 representative of credit card 10 which includes a device embodying the present invention. A sensor 102 is positioned in the upper left-hand portion of credit card 100. A driver circuit 104, for example, a processor or a logic circuit, is positioned in the upper middle portion of credit card 100 and is in communication with sensor 102. The driver circuit 104 is powered by a power source 105. Electrical energy supplied by the power source 105 is controlled by, for example, the driver circuit, a dedicated processor or dedicated logic circuit. A transducer 106 is positioned in the upper right-hand portion of credit card 100 and is in communication with driver circuit 104. Sensor 102, driver circuit 104, power source 105, and transducer 106 are all located outside of an embossing area 108.

Figure 4:
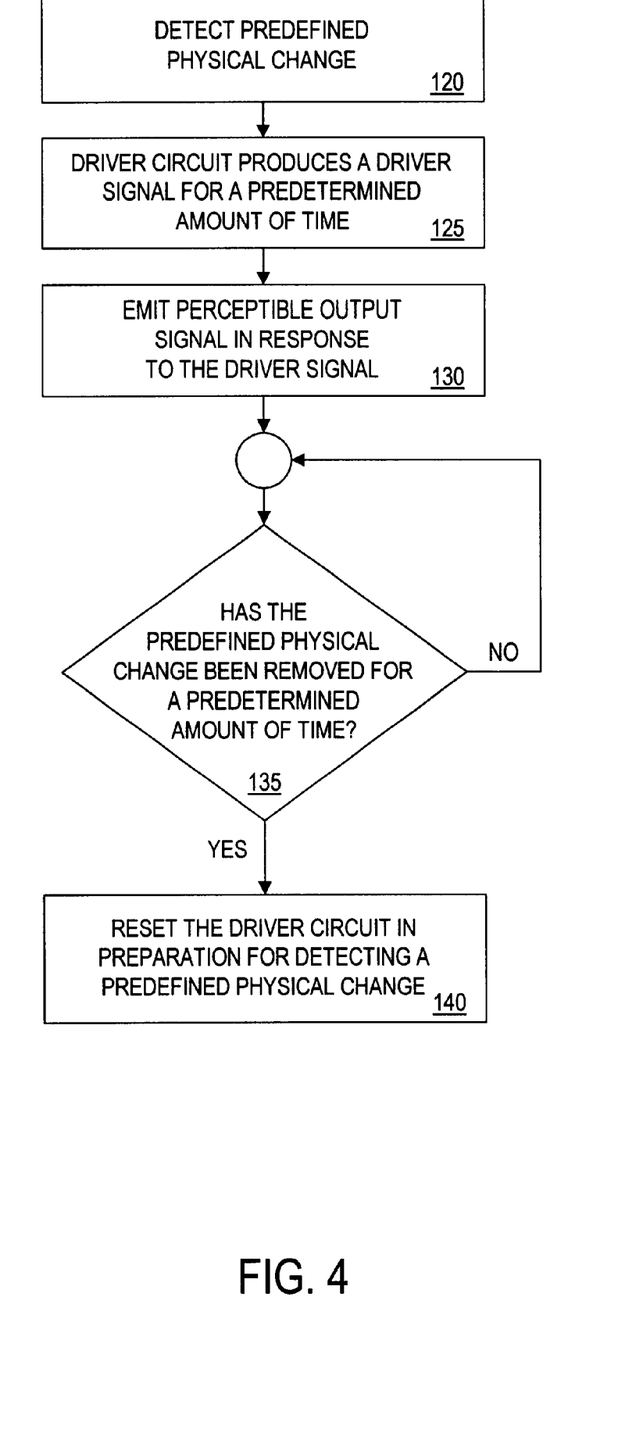
FIG. 4 is a flow chart illustrating the operation of the credit card shown in FIG. 3.

FIG. 4 is a flow chart illustrating the operation of credit card 100 shown in FIG. 3. At step 120, sensor 102 detects a predefined physical change and produces a signal. At step 125, driver circuit 104 receives the signal from sensor 102 and responds by producing a driver signal for a predetermined amount of time. At step 130, the driver signal produced at step 125 is transmitted to transducer 106 and a perceptible output signal is emitted in response to the driver signal. After the predetermined amount of time has passed, driver circuit 104 reverts to standby mode, whereby it discontinues producing the driver signal. Consequentially, transducer 106 discontinues emitting the perceptible output signal.

Step 135 includes determining whether the predefined physical change has been detected from sensor 102 for a predetermined amount of time. For example, if the sensor 102 is a solar cell, then step 135 may include determining whether a predetermined amount of time has passed after a consumer has closed his wallet and light is discontinued from shining on the solar cell. As another example, if the sensor 102 is a pressure sensor, then step 135 may include determining whether a predetermined amount of time has passed after a consumer has closed his wallet and pressure is reapplied to the pressure sensor.

If the predefined physical change has not been removed for a predetermined amount of time, then driver circuit 104 remains in standby mode. Step 135 is repeated periodically until the condition is satisfied, at which time driver circuit 104 carries out step 140. At step 140, driver circuit 104 is reset from standby mode to ready mode and, as a result, is ready for detecting a predefined physical change as described above in step 120. Steps 135 and 140 are executed, for example, when a consumer closes wallet 12 (FIG. 1) after having returned credit card 100 to a pocket of wallet 12 upon completion of a purchase.

Figure 5:
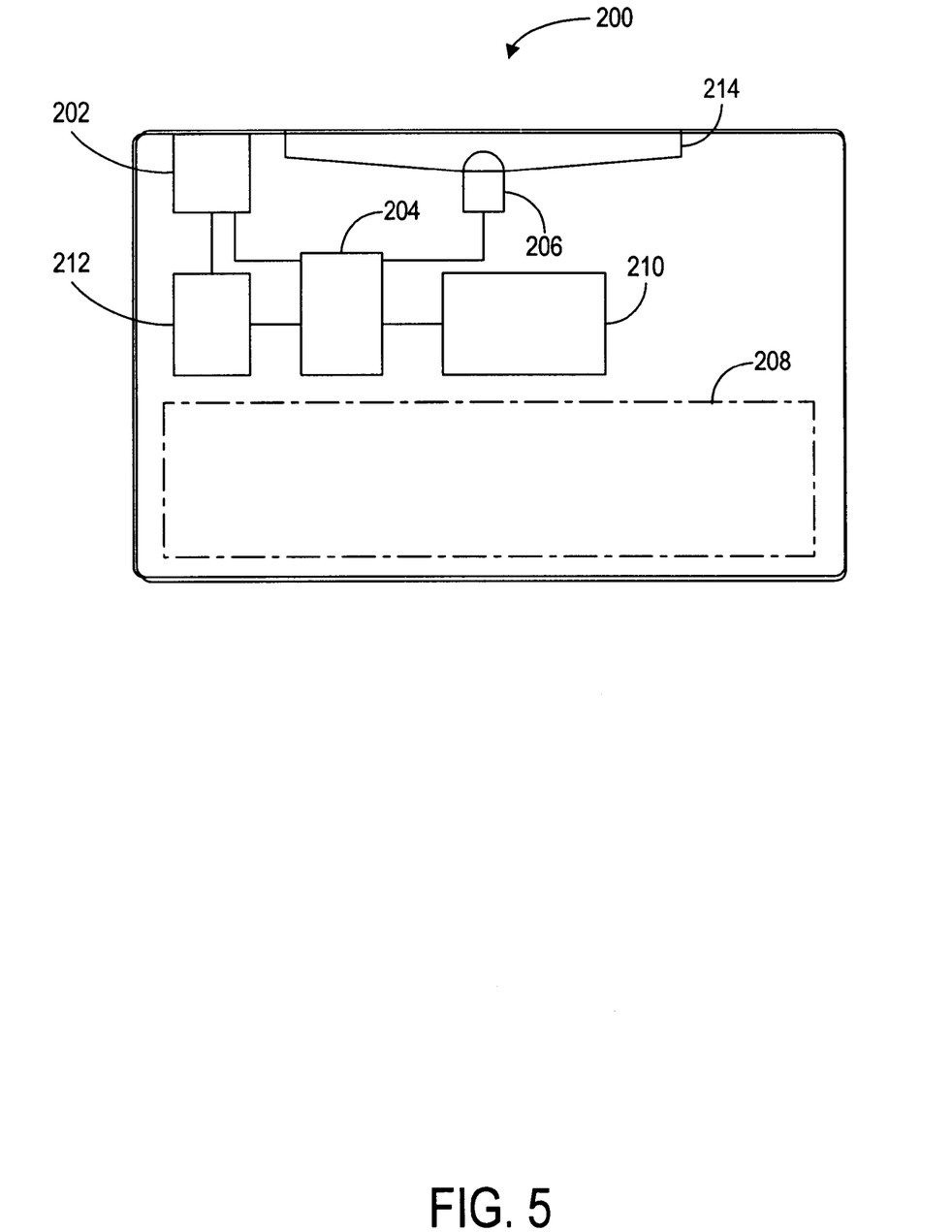
FIG. 5 is a front elevation view in schematic form of a credit card which includes an embodiment of the present invention, wherein a solar cell senses light and light is emitted from a light emitting diode.

Referring now to FIG. 5 there is illustrated in schematic form a credit card 200 illustrative of another embodiment of the present invention. A solar cell 202, or another appropriate sensor, is positioned in the upper left-hand portion of credit card 200. The solar cell 202 senses changes in ambient light at which time it produces a signal. A processor 204, or another appropriate processor, is positioned in the upper middle portion of credit card 200 and is in communication with solar cell 202. A battery 212, or another appropriate power source, provides power to processor 204. Memory 210 is in communication with processor 204, thereby enabling processor 204 to retrieve instructions and store data.

Battery 212 can be one of a number of battery types, for example, a solar cell, inductive power system, radioactive cell, or thin film lithium battery. Memory 210 can include, for example, (i) random access memory (RAM), (ii) read only memory (ROM), or (iii) a combination thereof.

An LED 206, or another appropriate transducer, is positioned in the upper right-hand portion of credit card 200 and is in communication with processor 204. A fiber optic channel 214 provides an optical path between LED 206 and the upper edge of credit card 200. Each of the above elements are located outside of an embossing area 208.

Figure 6:
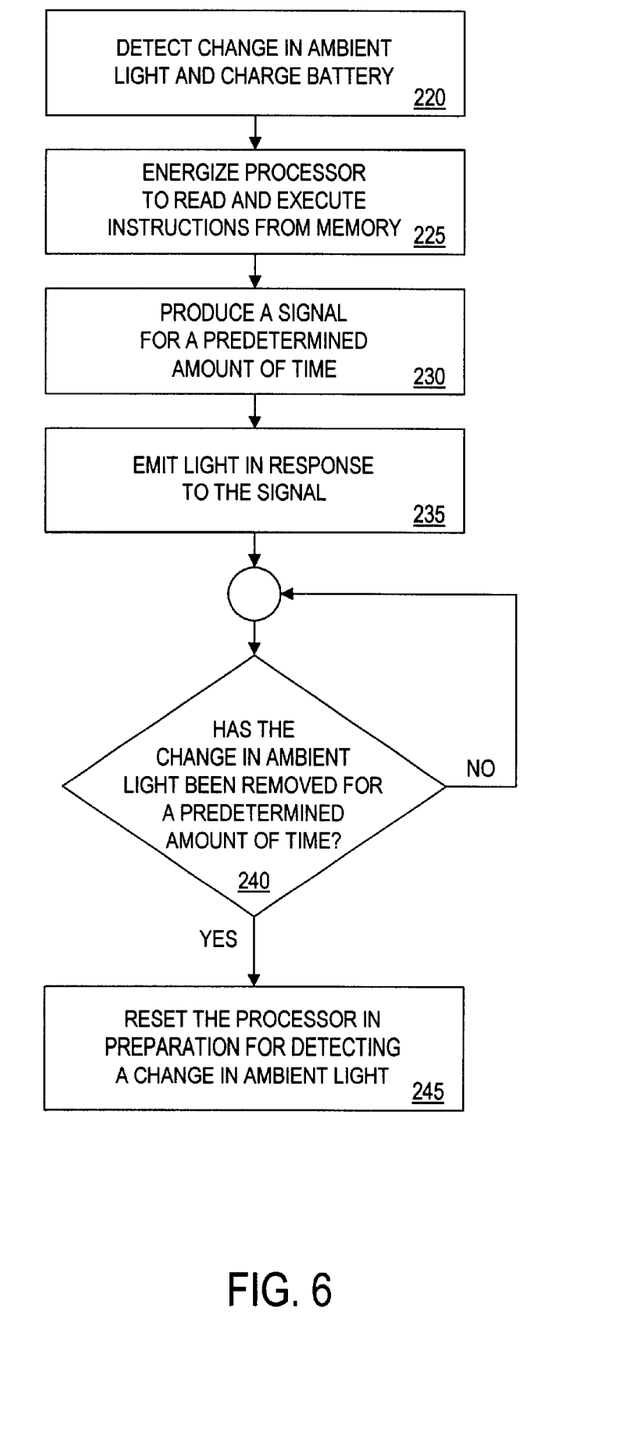
FIG. 6 is a flow chart illustrating the operation of the credit card shown in FIG. 5.

FIG. 6 is a flow chart illustrating the operation of the credit card 200 shown in FIG. 5. At step 220, solar cell 202 detects a change in ambient light and starts to charge battery 212. At step 225, the battery 212 is sufficiently charged to energize processor 204, which in turn reads and executes instructions from memory 210.

At step 230, the instructions cause processor 204 to output a signal for a predetermined amount of time. At step 235, LED 206 emits light in response to the signal. Depending on the instructions stored in memory, the output emitted from LED 206 can be a steady stream of light, short periodic pulses of light, or a pattern of light pulses. After the predetermined amount of time passes, processor 204 reverts to a standby mode and it discontinues producing the signal. Consequentially, LED 206 discontinues emitting light.

Step 240 includes processor 204 monitoring solar cell 202 to determine whether the change in ambient light has been removed for a predetermined amount of time. If the change in ambient light has not been removed, then processor 204 remains in standby mode. Step 240 is periodically repeated until the change in ambient light is removed, at which time processor 204 carries out step 245. At step 245, processor 204 is reset from standby mode to a ready mode and is ready for detecting a change in ambient light as described above in step 220.

Figure 7:
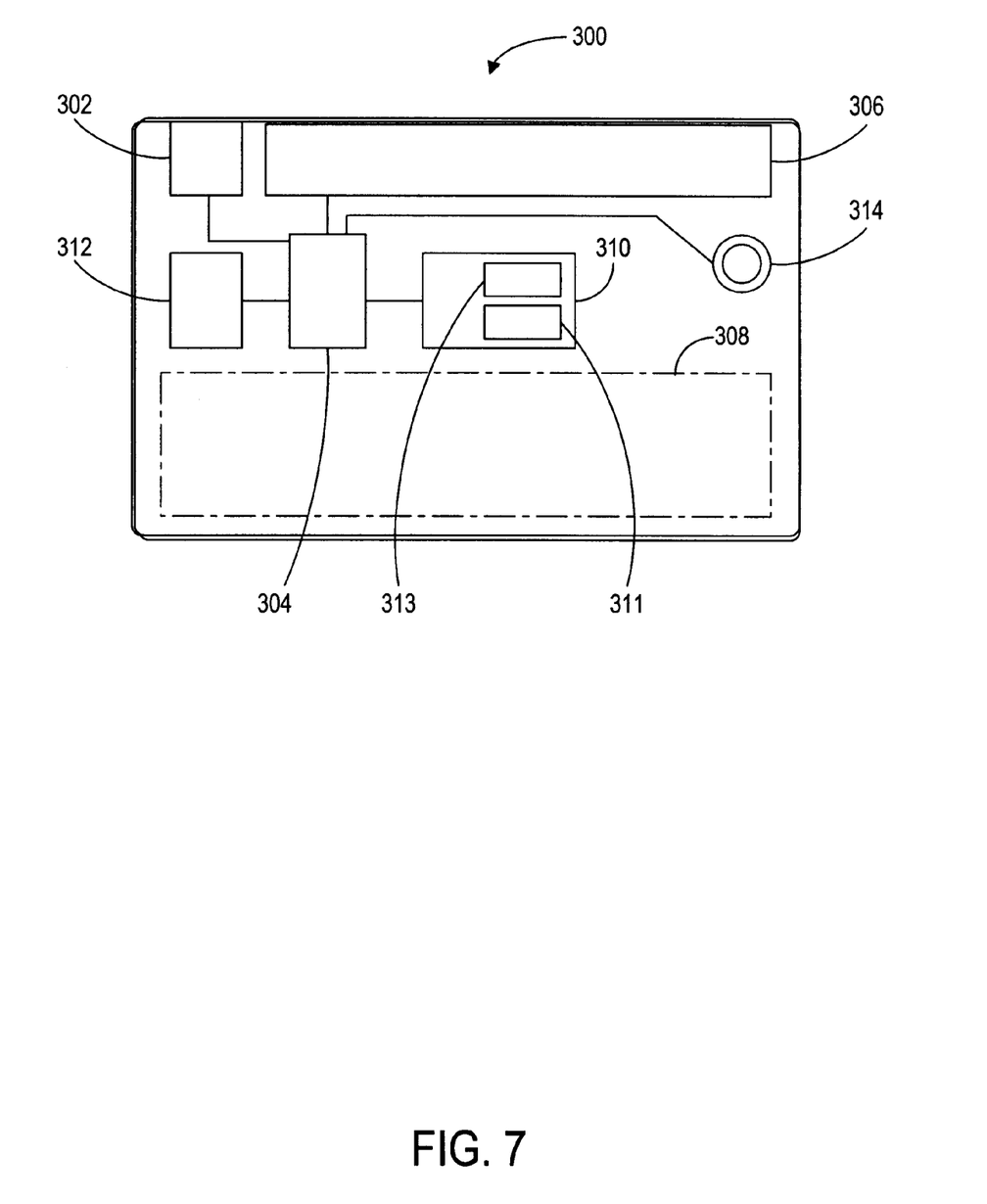
FIG. 7 is a front elevation view in schematic form of a credit card which includes an embodiment of the present invention, wherein a solar cell senses light and a switch is used to change messages displayed on a liquid crystal display.

Referring now to FIG. 7 there is illustrated in schematic form a credit card 300 which includes yet another embodiment of the present invention. In this embodiment, a solar cell 302 is positioned in the upper left-hand portion of credit card 300. The solar cell 302 is configured to sense changes in ambient light at which time it produces a signal. A processor 304 is positioned in the upper middle portion of credit card 300 and is in communication with solar cell 302. A battery 312 provides power to processor 304. A memory 310 is in communication with processor 304, thereby enabling the processor 304 to retrieve instructions and store data. Memory 310 includes a first register 311 and a second register 313.

A switch 314 is in communication with processor 304 for changing a message that may be displayed on an LCD 306, as will be described below. The LCD 306 is positioned in the upper right-hand portion of credit card 300 and is in communication with processor 304. Each of the above elements are located outside of an embossing area 308.

Figure 8:
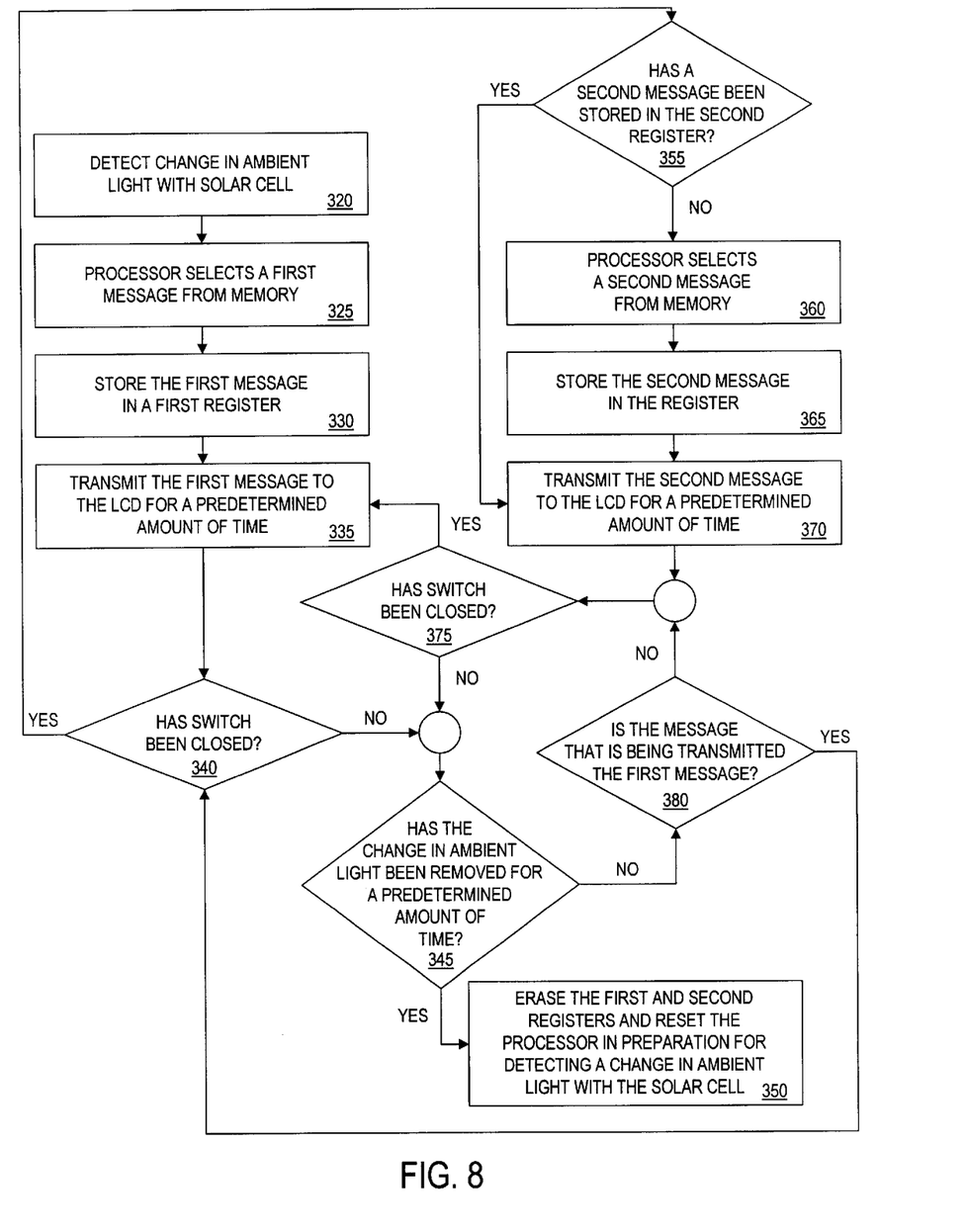
FIG. 8 is a flow chart illustrating the operation of the credit card shown in FIG. 7.

FIG. 8 is a flow chart illustrating the operation of credit card 300 shown in FIG. 7. The embodiment illustrated below is an example of a program that can be used with credit card 300. Generally, the program enables a consumer to switch between displaying a first message and a second message on LCD 306 by depressing switch 314. The messages can be displayed for a predetermined amount of time.

At step 320, solar cell 302 detects a change in ambient light and produces a signal. At step 325, processor 304 receives the signal from solar cell 302 and responds by selecting a first message from memory 310. At step 330, the first message is stored in first register 311 of memory 310.

The message to be displayed can be selected randomly. For example, the processor can randomly select bible passages, famous quotations, or jokes that are stored in memory. Alternatively, the message to be displayed can be selected according to the time or date. For example, a real-time clock (not shown), such as an INTERSIL ICM7170, (Intersil Corp., Cupertino, Calif.) can be included to communicate with processor 304 and the messages which are selected can relate to particular dates. The messages may relate, for example, to important dates in history, holidays, paydays, or birthdays. Further, the messages can also be dynamic and/or iconic as is well known in the art. Dates may be (i) entered by a customer via an input device such as a keypad, and/or (ii) programmed into the memory when the card is manufactured.

At step 335, the first message is transmitted to and displayed on LCD 306 for a predetermined amount of time. At step 340, processor 304 determines if switch 314 has been closed. If switch 314 has not been closed, then processor 304 advances to step 345. At step 345, processor 304 determines whether the change in ambient light has been removed for a predetermined amount of time. If so, processor 304 advances to step 350 at which the first and a second registers, 311 and 313, respectively, are erased and processor 304 is reset in preparation for detecting a change in ambient light with solar cell 302.

If, at step 340, the switch 314 is determined to have been closed, then processor 304 advances to step 355. At step 355, processor 304 determines whether a second message has been stored in second register 313 of memory 310. If a second message has not already been stored in second register 313, then processor 304 advances to step 360. At step 360, processor 304 selects a second message from memory 310. As described above, the message can be selected randomly. At step 365, the second message is stored in second register 313. If, at step 355, processor 304 determines a second message has been stored in second register 313, then processor 304 loops around steps 360 and 365 and advances to step 370.

At step 370, the second message is transmitted to and displayed on LCD 306 for a predetermined amount of time. At step 375, processor 304 determines whether switch 314 has been closed. If switch 314 has not been closed, then processor 304 advances to step 345. If switch 314 has been closed, then processor 304 advances to step 335.

As described above, at step 345, processor 304 determines whether the change in ambient light has been removed for a predetermined amount of time. If so, processor 304 advances to step 350. If the change in ambient light has not been removed, then processor 304 advances to step 380.

At step 380, processor 304 determines whether the message presently being transmitted is the first message. If the message is the first message, then processor 304 advances to step 340. If the message is not the first message, then processor 304 advances to step 375. Processing proceeds thereafter as described above until finally ending at step 350.

Figure 9:
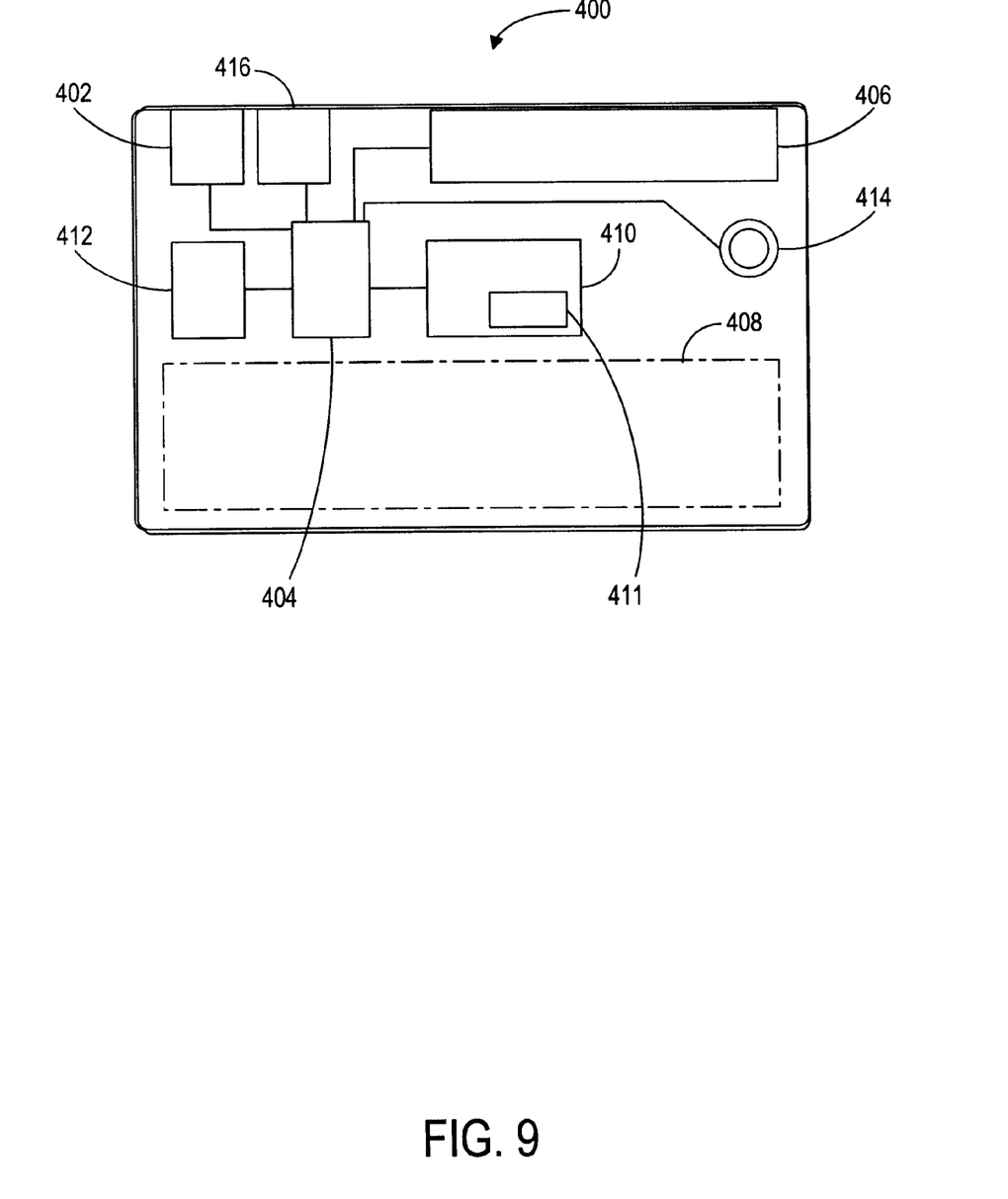
FIG. 9 is a front elevation view in schematic form of a credit card which includes an embodiment of the present invention, wherein a solar cell senses light and a switch is used to toggle between two transducers.

Referring now to FIG. 9, a credit card 400 is illustrated in schematic form to depict yet another embodiment of the present invention. In this embodiment, a solar cell 402 is positioned in the upper left-hand portion of credit card 400. The solar cell 402 is configured to sense changes in ambient light at which time it produces a signal. A processor 404 is positioned in the upper middle portion of credit card 400 and is in communication with solar cell 402. A battery 412 provides power to processor 404. Memory 410 is in communication with processor 404, thereby enabling the processor 404 to retrieve instructions and store data. A switch 414 is in communication with processor 404 for switching between displaying messages on an LCD 406 and emitting a light signal on LED 416.

The LCD 406 is positioned in the upper right-hand portion of credit card 400 and is in communication with processor 404. The LED 416 is positioned in the left-hand portion of credit card 400, between the solar cell 402 an the LCD 406. Each of the above elements are located outside of an embossing area 408.

Figure 10:
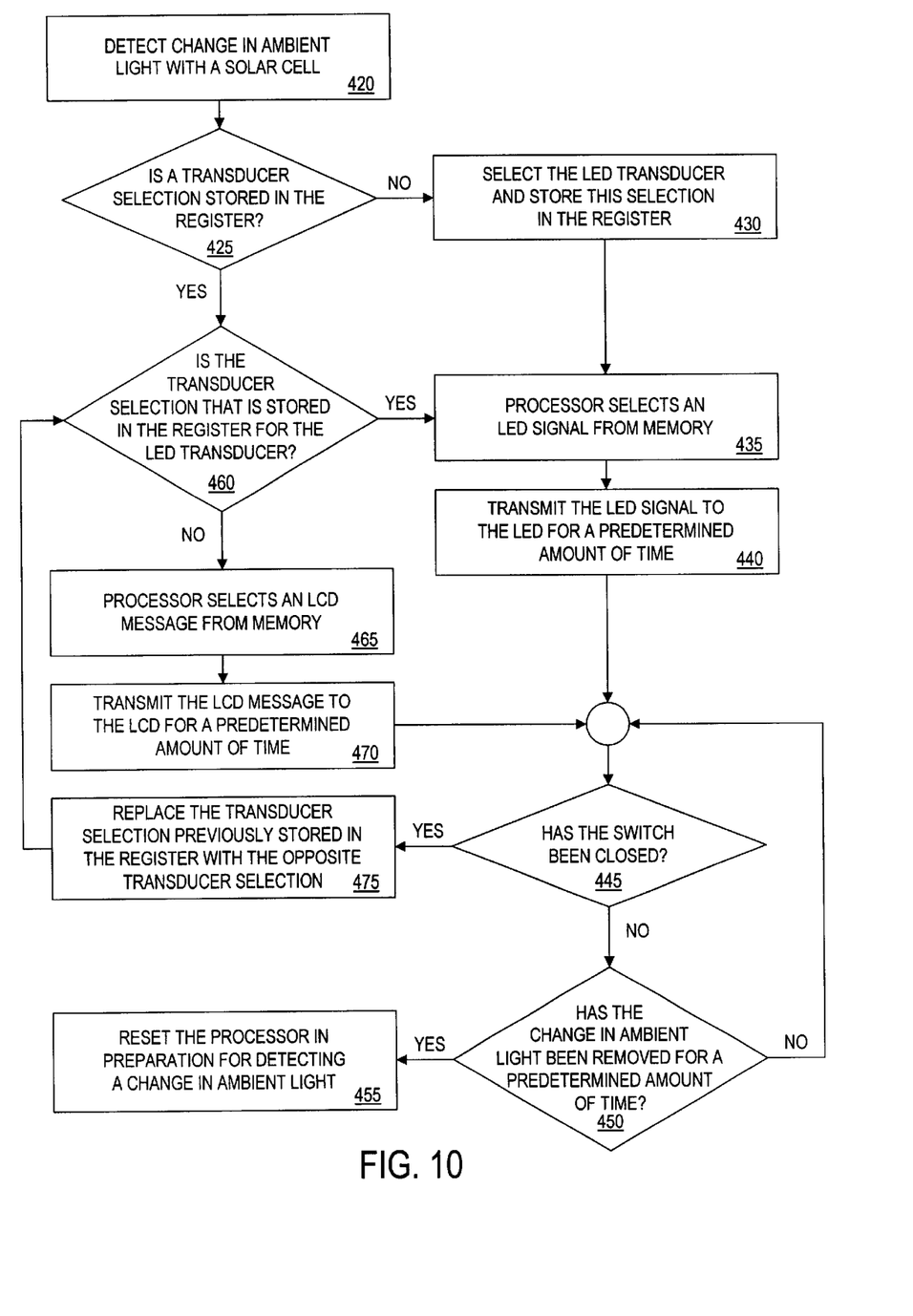
FIG. 10 is a flow chart illustrating the operation of the credit card shown in FIG. 9.

FIG. 10 is a flow chart illustrating the operation of credit card 400 shown in FIG. 9. The embodiment illustrated below is an example of a program that can be used with credit card 400. Generally, the program enables a consumer to switch between displaying a message on LCD 406 and emitting a light signal on LED 416 by depressing switch 414.

At step 420, solar cell 402 detects a change in ambient light and produces a signal. At step 425, processor 404 determines whether a transducer selection is stored in a register 411 of memory 410. If a transducer selection is not stored in register 411, then processor 404 advances to step 430. At step 430, the LED 416 transducer is selected and the selection is stored in register 411.

At step 435, processor 404 selects an LED signal from memory 410. At step 440, the signal selected at step 435 is transmitted to LED 416 for a predetermined amount of time. LED 416 emits light in response to the selected signal.

At step 445, processor 404 determines whether switch 414 has been closed. If switch 414 has not been closed, then processor 404 advances to step 450. At step 450, processor 404 determines whether the change in ambient light has been removed for a predetermined amount of time. If so, processor 404 advances to step 455, wherein processor 404 is reset in preparation for detecting a change in ambient light with solar cell 402. If, at step 450, it is determined that the change in ambient light has not been removed, then processor 404 returns to step 445.

If, at step 425, it is determined that a transducer selection is stored in register 411, then processor 404 advances to step 460. At step 460, processor 404 determines whether the transducer selection that is stored in register 411 is for LED transducer 416. If the selection is for LED transducer 416, then processor 404 advances to step 435. If the selection is for LCD transducer 406, then processor 404 advances to step 465.

At step 465, processor 404 selects an LCD message from memory 410. At step 470, the message selected at step 465 is transmitted to LCD 406 for a predetermined amount of time. LCD 406 displays the message in response to receiving the selected message and processor 404 advances to step 445.

As described above, at step 445 processor 404 determines whether switch 414 has been closed. If switch 414 has not been closed, then processor 404 advances to step 450. If switch 414 has been closed, then processor 404 advances to step 475. At step 475, the transducer selection previously stored in register 411 is replaced with the other transducer selection. That is, if LED transducer 416 was previously selected as the active transducer, then processor 404 would now select the LCD transducer 406 as the active transducer and store this selection in register 411, and visa versa. Processing proceeds thereafter as described above until finally ending at step 455.

Those skilled in the art will readily recognize that a number of alterations can be made to the embodiments described above without departing from the scope of the present invention. For example, a credit card including the basic embodiment of the present invention as described above and illustrated in FIG. 3 can utilize a speaker, such as a piezoelectric vibrator, as a transducer for emitting sound stored in machine readable form in a memory. The speaker can emit a sound, e.g., a chirping sound, when a consumer opens his wallet. A variation of this embodiment includes utilizing magnetic strip 24 (FIG. 2) as a sensor and configuring the device to emit a sound when the credit card is passed through a credit card reader.

As another example, a credit card including the basic embodiment of the present invention as described above and illustrated in FIG. 3 can utilize a pressure sensor that detects when a wallet has been opened. Thus, when the wallet is opened and the sensor detects that the pressure has been removed, it activates, for example, an LCD, LED, or speaker.

It is clear from the foregoing disclosure that the present device and method for promoting the selection and use of a credit card provides an advancement in the art. The device and method provides a credit card issuer a variety of ways in which they can make credit cards distinguishable from other credit cards.

While the device and method disclosed herein has been described with respect to various specific embodiments, those skilled in the art will readily appreciated that various modifications, changes, and enhancements may be made thereto without departing from the spirit and scope of the invention as defined by the appended claims.

What is claimed is:

1. A device comprising:
   means for sensing a predefined physical change;
   means for producing at least one driver signal for a predetermined amount of time, wherein production of the at least one driver signal is initiated when the sensing means senses the predefined physical change; and
   means for emitting, in response to receiving the at least one driver signal, at least one output signal promoting the use of a credit card.

2. A device as recited in claim 1, wherein the predefined physical change is a change in ambient light.

3. A device as recited in claim 2, wherein the means for sensing a predefined physical change comprises a solar cell.

4. A device as recited in claim 1, wherein the predefined physical change is a change in ambient pressure.

5. A device as recited in claim 4, wherein the means for sensing a predefined physical change comprises a pressure sensor.

6. A device as recited in claim 1, wherein the predefined physical change is a change in ambient noise.

7. A device as recited in claim 6, wherein the means for sensing a predefined physical change comprises a microphone.

8. A device as recited in claim 1, wherein the means for producing at least one driver signal comprises a processor.

9. A device as recited in claim 8, wherein the processor generates a random number which is used to select the at least one driver signal from a plurality of driver signals stored in a memory.

10. A device as recited in claim 9, wherein the means for emitting at least one perceptible output signal comprises a liquid-crystal display and the plurality of driver signals represent messages.

11. A device as recited in claim 9, wherein the means for emitting at least one perceptible output signal comprises a liquid-crystal display and the plurality of driver signals represent lottery numbers.

12. A device as recited in claim 9, wherein the means for emitting at least one perceptible output signal comprises a speaker and the plurality of driver signals represent phrases.

13. A device as recited in claim 1, wherein the means for producing at least one driver signal comprises a logic circuit.

14. A device as recited in claim 1, further comprising a power source for energizing the means for producing at least one driver signal.

15. A device as recited in claim 14, wherein the power source provides power throughout the useful life of the credit card.

16. A device as recited in claim 14, wherein the power source is selected from the group consisting of a solar cell, an inductive power system, a radioactive cell, and a thin film lithium battery.

17. A device as recited in claim 14, further comprising means for controlling output of the power source.

18. A device as recited in claim 17, wherein the means for controlling the power source comprises a processor.

19. A device as recited in claim 17, wherein the means for controlling the power source comprises a logic circuit.

20. A device as recited in claim 1, wherein the means for emitting at least one perceptible output signal comprises a light-emitting diode.

21. A device as recited in claim 20, wherein the means for producing at least one driver signal transmits driver signals to the light-emitting diode intermittently.

22. A device as recited in claim 20, wherein the means for producing at least one driver signal transmits driver signals to the light-emitting diode according to a predetermined pattern.

23. A device as recited in claim 20, wherein light emitted from the light-emitting diode is transmitted through the credit card by a fiber optic channel.

24. A device as recited in claim 1, wherein the means for emitting at least one perceptible output signal comprises a liquid-crystal display.

25. A device as recited in claim 24, wherein the means for emitting at least one perceptible output signal further comprises a speaker; and further comprising a switch adapted and configured to redirect the at least one driver signal from one of the liquid-crystal display and the speaker to the other.

26. A device as recited in claim 24, wherein the means for producing at least one driver signal further comprises a clock and is adapted and configured to determine time therewith; and wherein the means for producing at least one driver signal transmits particular driver signals to the means for emitting at least one perceptible output signal based on the time.

27. A device as recited in claim 24, wherein the means for producing at least one driver signal transmits particular driver signals to the liquid-crystal display to simulate motion.

28. A device as recited in claim 1, wherein the means for emitting at least one perceptible output signal comprises means for emitting an audible signal.

29. A device as recited in claim 28, wherein the means for emitting an audible signal comprises a piezoelectric element.

30. A device as recited in claim 1, wherein the means for producing at least one driver signal further comprises a clock and is adapted and configured to determine time therewith.

31. A device as recited in claim 1, further comprising a means for resetting the means for producing at least one driver signal so it can reproduce the at least one driver signal for a predetermined amount of time.

32. A device as recited in claim 31, wherein the means for resetting is initiated after the predefined physical change is removed.

33. A device as recited in claim 1, wherein all components of the device are positioned outside of areas to be embossed on the credit card.

34. A device as recited in claim 1, wherein the credit card conforms to ISO 7810.

35. A device comprising:
   a sensor adapted and configured to sense a predefined physical change;
   a driver circuit adapted and configured to produce at least one driver signal for a predetermined amount of time, wherein production of the at least one driver signal is initiated when the sensor senses the predefined physical change; and
   a transducer adapted and configured to emit, in response to receiving the at least one driver signal, at least one perceptible output signal promoting the use of a credit card.

36. A device as recited in claim 35, wherein the predefined physical change is a change in ambient light.

37. A device as recited in claim 36, wherein the sensor comprises a solar cell.

38. A device as recited in claim 35, wherein the predefined physical change is a change in ambient pressure.

39. A device as recited in claim 38, wherein the sensor comprises a pressure sensor.

40. A device as recited in claim 35, wherein the predefined physical change is a change in ambient noise.

41. A device as recited in claim 40, wherein the sensor comprises a microphone.

42. A device as recited in claim 35, wherein the driver circuit comprises a processor.

43. A device as recited in claim 42, wherein the processor generates a random number which is used to select the at least one driver signal from a plurality of driver signals stored in a memory.

44. A device as recited in claim 43, wherein the transducer comprises a liquid-crystal display and the plurality of driver signals represent messages.

45. A device as recited in claim 43, wherein the transducer comprises a liquid-crystal display and the plurality of driver signals represent lottery numbers.

46. A device as recited in claim 43, wherein the transducer comprises a speaker and the plurality of driver signals represent phrases.

47. A device as recited in claim 35, wherein the driver circuit comprises a logic circuit.

48. A device as recited in claim 35, further comprising a power source for energizing the driver circuit.

49. A device as recited in claim 48, wherein the power source provides power throughout the useful life of the credit card.

50. A device as recited in claim 48, wherein the power source is selected from the group consisting of a solar cell, an inductive power system, a radioactive cell, and a thin film lithium battery.

51. A device as recited in claim 48, further comprising a controller to control output of the power source.

52. A device as recited in claim 51, wherein the controller comprises a processor.

53. A device as recited in claim 51, wherein the controller comprises a logic circuit.

54. A device as recited in claim 35, wherein the transducer comprises a light-emitting diode.

55. A device as recited in claim 54, wherein the driver circuit transmits driver signals to the light-emitting diode intermittently.

56. A device as recited in claim 54, wherein the driver circuit transmits driver signals to the light-emitting diode according to a predetermined pattern.

57. A device as recited in claim 54, wherein light emitted from the light-emitting diode is transmitted through the credit card by a fiber optic channel.

58. A device as recited in claim 35, wherein the transducer comprises a liquid-crystal display.

59. A device as recited in claim 58, further comprising a speaker and a switch adapted and configured to redirect the at least one driver signal from one of the liquid-crystal display and the speaker to the other of the liquid-crystal display and the speaker.

60. A device as recited in claim 58, wherein the driver circuit further comprises a clock and is adapted and configured to determine time therewith; and wherein the driver circuit transmits particular driver signals to the transducer based on the time.

61. A device as recited in claim 58, wherein the driver circuit transmits particular driver signals to the liquid-crystal display to simulate motion of displayed images.

62. A device as recited in claim 35, wherein the transducer comprises a component for emitting an audible signal.

63. A device as recited in claim 62, wherein the component for emitting an audible signal comprises a piezoelectric vibrator.

64. A device as recited in claim 35, wherein the driver circuit further comprises a clock and is adapted and configured to determine time therewith.

65. A device as recited in claim 35, further comprising a resetting circuit adapted and configured to reset the driver circuit so it can reproduce the at least one driver signal for a predetermined amount of time.

66. A device as recited in claim 65, wherein the resetting circuit resets the driver circuit after the predefined physical change is removed.

67. A device as recited in claim 35, wherein all components of the device are positioned outside of areas to be embossed on the credit card.

68. A device as recited in claim 35, wherein the credit card conforms to ISO 7810.

69. A method comprising:
    detecting a predefined physical change;
    activating a transducer to produce, in response to the detected physical change, at least one output signal promoting the use of a credit card; and
    deactivating the transducer after a predetermined amount of time.

70. A method as recited in claim 69, wherein the predefined physical change is a change in ambient light.

71. A method as recited in claim 70, wherein the change in ambient light is detected with a solar cell.

72. A method as recited in claim 69, wherein the predefined physical change is a change in ambient pressure.

73. A method as recited in claim 72, wherein the change in ambient pressure is detected with a pressure sensor.

74. A method as recited in claim 69, wherein the predefined physical change is a change in ambient noise which is detected with a microphone.

75. A method as recited in claim 69, wherein the transducer is activated by an activating circuit.

76. A method as recited in claim 75, wherein the activating circuit comprises a processor.

77. A method as recited in claim 76, wherein the processor randomly selects the at least one output signal to be produced by the transducer.

78. A method as recited in claim 76, wherein the transducer comprises a liquid-crystal display and the at least one output signal comprises at least one message.

79. A method as recited in claim 76, wherein the transducer comprises a liquid-crystal display and the at least one output signal comprises at least one lottery number.

80. A method as recited in claim 76, wherein the transducer comprises a speaker and the at least one output signal comprises at least one phrase.

81. A method as recited in claim 75, wherein the activating circuit comprises a logic circuit.

82. A method as recited in claim 75, further comprising energizing the activating circuit with a power source.

83. A method as recited in claim 82, wherein the power source provides power throughout the useful life of the credit card.

84. A method as recited in claim 82, wherein the power source is selected from the group consisting of a solar cell, an inductive power system, a radioactive cell, and a thin film lithium battery.

85. A method as recited in claim 82, further comprising controlling output of the power source with a controller.

86. A method as recited in claim 85, wherein the controller comprises a processor.

87. A method as recited in claim 85, wherein the controller comprises a logic circuit.

88. A method as recited in claim 75, further comprising resetting the activating circuit so it can be reactivated.

89. A method as recited in claim 88, wherein the activating circuit is reset after the predefined physical change is no longer detected.

90. A method as recited in claim 69, wherein the transducer comprises a light-emitting diode.

91. A method as recited in claim 90, wherein the light-emitting diode is activated intermittently.

92. A method as recited in claim 90, wherein the light-emitting diode is activated according to a predetermined pattern.

93. A method as recited in claim 90, wherein light emitted from the light-emitting diode is transmitted through the credit card by a fiber optic channel.

94. A method as recited in claim 69, wherein the transducer comprises a liquid-crystal display.

95. A method as recited in claim 94, further comprising activating a second transducer and switching between the two transducers.

96. A method as recited in claim 94, wherein the liquid-crystal display is activated to produce particular messages based on a time.

97. A method as recited in claim 94, wherein the liquid-crystal display is activated to produce output signals that simulate motion of displayed images.

98. A method as recited in claim 69, wherein the transducer comprises a component for emitting an audible signal.

99. A method as recited in 98, wherein the component for emitting an audible signal comprises a piezoelectric vibrator.

100. A method of using a credit card, wherein the credit card includes a device to promote the selection of the credit card, the method comprising:
    subjecting the credit card to a detectable physical change;
    observing the credit card's response to the detectable physical change; and
    retrieving the credit card for use after observing its response.

101. A method as recited in claim 100, wherein the detectable physical change is a change in ambient light.

102. A method as recited in claim 101, wherein the change in ambient light is detected with a solar cell.

103. A method as recited in claim 100, wherein the detectable physical change is a change in ambient pressure.

104. A method as recited in claim 103, wherein the change in ambient pressure is detected with a pressure sensor.

105. A method as recited in claim 100, wherein the detectable physical change is a change in ambient noise.

106. A method as recited in claim 105, wherein the change in ambient noise is detected with a microphone.

107. A method as recited in claim 100, wherein the credit card's response is observable through a transducer.

108. A method as recited in claim 107, wherein the transducer is driven by a processor.

109. A method as recited in claim 107, wherein the transducer is driven by a logic circuit.

110. A method as recited in claim 108, wherein the processor is energized with a power source.

111. A method as recited in claim 110, wherein the power source provides power throughout the useful life of the credit card.

112. A method as recited in claim 111, wherein output of the power source is controlled by a controller.

113. A method as recited in claim 107, wherein the transducer comprises a liquid-crystal display.

114. A method as recited in claim 107, wherein the transducer comprises a speaker.

115. A method as recited in claim 107, wherein the transducer comprises a light-emitting diode.

116. A method as recited in claim 115, wherein the light-emitting diode is activated intermittently.

117. A method as recited in claim 115, wherein the light-emitting diode is activated according to a predetermined pattern.

118. A method as recited in claim 115, wherein light emitted from the light-emitting diode is transmitted through the credit card by a fiber optic channel.

119. A credit card including a device comprising:

a light emitting diode mounted to a top portion of the credit card;

a solar cell mounted to the top portion of the credit card, the solar cell adapted and configured to energize the light emitting diode to blink for several seconds to promote the use of the credit card when subjected to a predetermined amount of ambient light, and further adapted and configured to reset itself after the several seconds have passed.

120. A credit card including a device comprising:

a solar cell mounted to a top portion of the credit card for detecting light;

a memory having a plurality of messages stored thereon;

a processor adapted and configured to generate a random number when the solar cell detects light to promote the use of the credit card, the random number used to select at least one of the plurality of messages from the memory; and a liquid crystal display mounted to the top portion of the credit card and adapted and configured to receive and display the at least one selected message for several seconds thereon.

\* \* \* \* \*